(12) United States Patent
de Silva et al.

(10) Patent No.: US 9,264,351 B2
(45) Date of Patent: Feb. 16, 2016

(54) SYSTEM AND METHOD FOR UTILIZATION OF A SEGMENTATION IDENTIFICATION TO SUPPORT TRANSMISSION OF DATA TO A DESTINATION NODE

(71) Applicant: CISCO TECHNOLOGY, INC., San Jose, CA (US)

(72) Inventors: Suran Saminda de Silva, Saratoga, CA (US); Chiajen Tsai, Cupertino, CA (US); Liqin Dong, San Jose, CA (US); Yibin Yang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 139 days.

(21) Appl. No.: 14/020,791

(22) Filed: Sep. 7, 2013

(65) Prior Publication Data
US 2015/0071286 A1    Mar. 12, 2015

(51) Int. Cl.
*H04L 12/28* (2006.01)
*H04L 12/713* (2013.01)
*H04L 12/741* (2013.01)

(52) U.S. Cl.
CPC .............. *H04L 45/586* (2013.01); *H04L 45/54* (2013.01)

(58) Field of Classification Search
None
See application file for complete search history.

(56) References Cited

U.S. PATENT DOCUMENTS

2009/0109983 A1* 4/2009 Dixon et al. ............... 370/401
2013/0170490 A1* 7/2013 Kreeger et al. ............ 370/390

OTHER PUBLICATIONS

Eastlake, Donald, et al., "TRILL (Transparent Interconnection of Lots and Links): Fine-Grained Labeling," TRILL Working Group Internet Draft, Mar. 29, 2013, 32 pages; http://tools.ietf.org/pdf/draft-ietf-trill-fine-labeling-06.pdf.
Perlman, R., et al., "Routing Bridges (Rbridges): Base Protocol Specification," Internet Engineering Task Force (IETF) RF 6325, Jul. 2011, 99 pages; http://tools.ietf.org/pdf/rfc6325.pdf.
Rosen, E., et al., "BGP/MPLS IP Virtual Private Networks (VPNs)," Network Working Group RFC 4364, Feb. 2006, 47 pages; http://tools.ietf.org/pdf/rfc4364.pdf.

* cited by examiner

*Primary Examiner* — Minh-Trang Nguyen
(74) *Attorney, Agent, or Firm* — Patent Capital Group

(57) ABSTRACT

A method is provided in one example and includes receiving, at a receiving node, a packet that comprises information indicative of an internet protocol address and a segmentation identification, selecting a virtual routing and forwarding table corresponding with the segmentation identification, identifying a destination node based, at least in part, on the internet protocol address and the virtual routing and forwarding table, and transmitting the packet to the destination node.

20 Claims, 7 Drawing Sheets

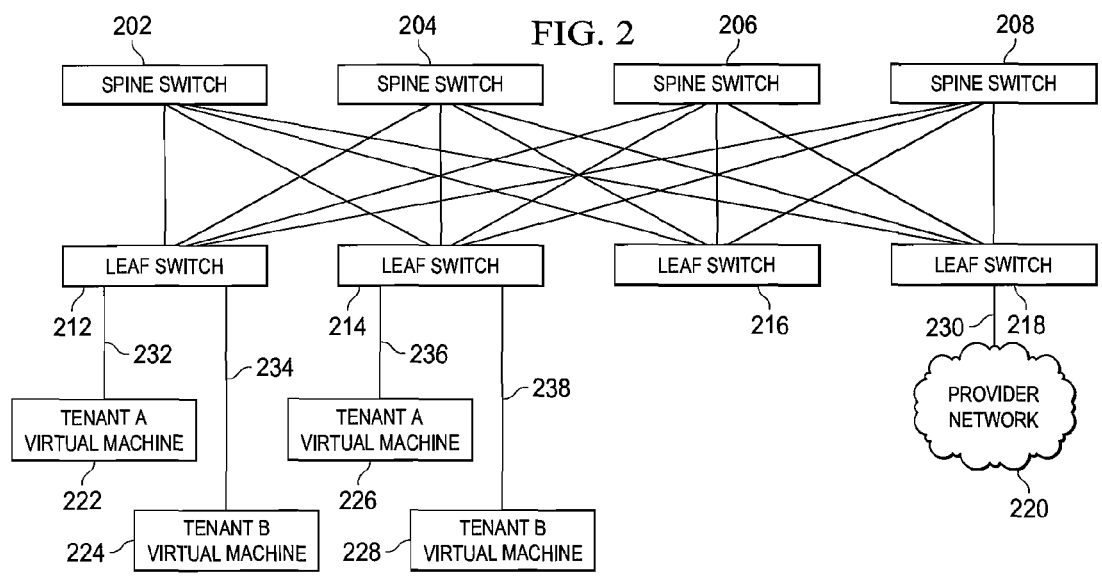

FIG. 5

| 500 SEGMENTATION IDENTIFICATION CORRELATION TABLE | |
|---|---|
| 502 SEGMENTATION IDENTIFICATION | VIRTUAL ROUTING AND FORWARDING TABLE 512 |
| 504 SEGMENTATION IDENTIFICATION | VIRTUAL ROUTING AND FORWARDING TABLE 514 |
| 506 SEGMENTATION IDENTIFICATION | VIRTUAL ROUTING AND FORWARDING TABLE 516 |
| 508 SEGMENTATION IDENTIFICATION | VIRTUAL ROUTING AND FORWARDING TABLE 518 |

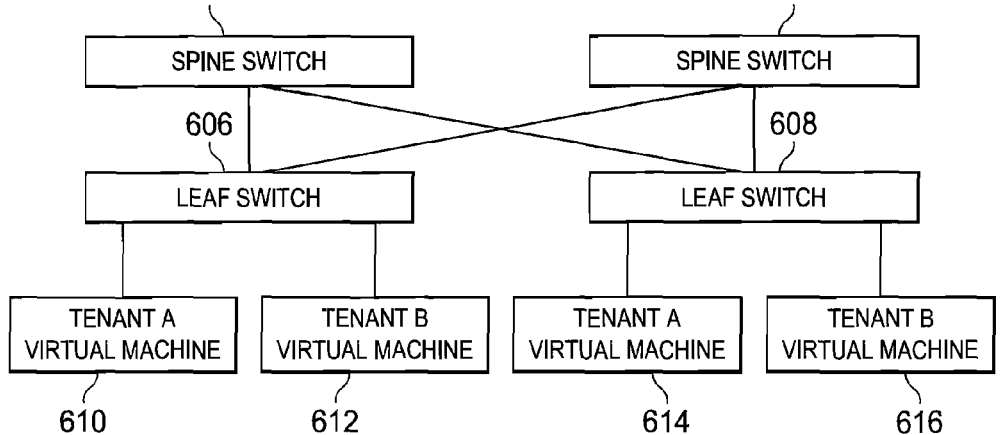

| SPINE SWITCH CONFIGURATION | |
|---|---|
| VLAN 1 | VN-SEGMENT 10001 |
| INTERFACE VLAN 1 | IP ADDRESS 1.1.1.3/24 |
| ROUTER BGP 6 | NEIGHBOR 1.1.1.1 REMOTE-AS 6<br>NEIGHBOR 1.1.1.2 REMOTE-AS 6 |

630

| LEAF SWITCH CONFIGURATION | |
|---|---|
| VLAN 1 | VN-SEGMENT 10001 |
| VLAN 10 | VN-SEGMENT 10010 |
| VLAN 20 | VN-SEGMENT 10020 |
| VLAN 100 | VN-SEGMENT 10100 |
| VLAN 200 | VN-SEGMENT 10200 |
| INTERFACE VLAN 1 | IP ADDRESS 1.1.1.1/24 |
| INTERFACE VLAN 10 | IP ADDRESS 1.1.1.1/24<br>MEMBER VRF TENANT A |
| INTERFACE VLAN 20 | IP ADDRESS 1.1.1.1/24<br>MEMBER VRF TENANT B |
| INTERFACE VLAN 100 | IP ADDRESS 5.1.1.254/24<br>MEMBER VRF TENANT A |
| INTERFACE VLAN 200 | IP ADDRESS 5.1.1.254/24<br>MEMBER VRF TENANT B |
| VRF CONTEXT | TENANT A |
| VRF CONTEXT | TENANT B |
| ROUTER BGP 6 | NEIGHBOR 1.1.1.3 REMOTE-AS 6 |

| LEAF SWITCH CONFIGURATION | |
|---|---|
| VLAN 1 | VN-SEGMENT 10001 |
| VLAN 10 | VN-SEGMENT 10010 |
| VLAN 20 | VN-SEGMENT 10020 |
| VLAN 100 | VN-SEGMENT 10100 |
| VLAN 200 | VN-SEGMENT 10200 |
| INTERFACE VLAN 1 | IP ADDRESS 1.1.1.2/24 |
| INTERFACE VLAN 10 | IP ADDRESS 1.1.1.2/24 MEMBER VRF TENANT A |
| INTERFACE VLAN 20 | IP ADDRESS 1.1.1.2/24 MEMBER VRF TENANT B |
| INTERFACE VLAN 100 | IP ADDRESS 5.1.1.254/24 MEMBER VRF TENANT A |
| INTERFACE VLAN 200 | IP ADDRESS 5.1.1.254/24 MEMBER VRF TENANT B |
| VRF CONTEXT | TENANT A |
| VRF CONTEXT | TENANT B |
| ROUTER BGP 6 | NEIGHBOR 1.1.1.3 REMOTE-AS 6 |

FIG. 6D

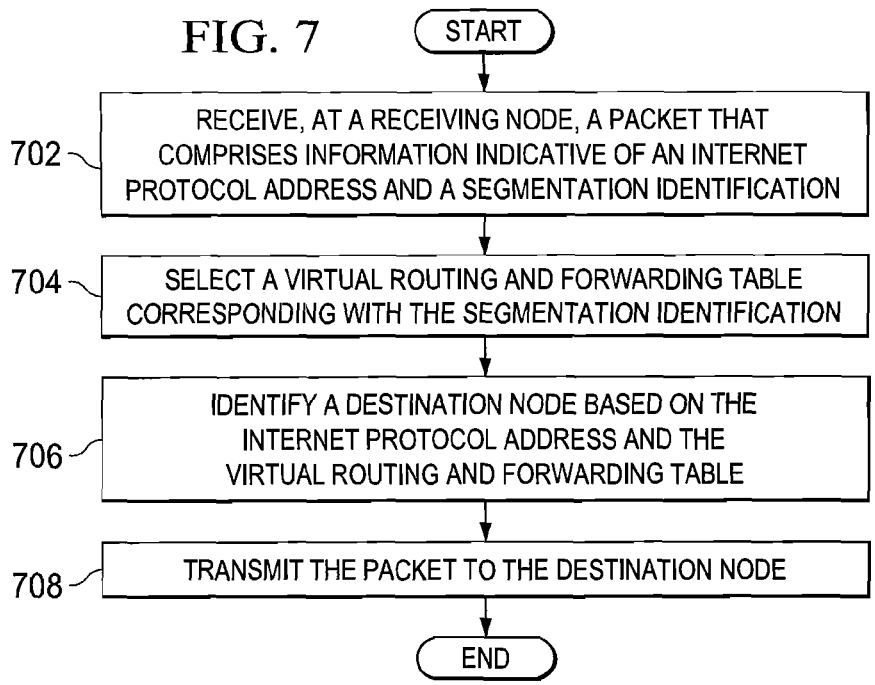
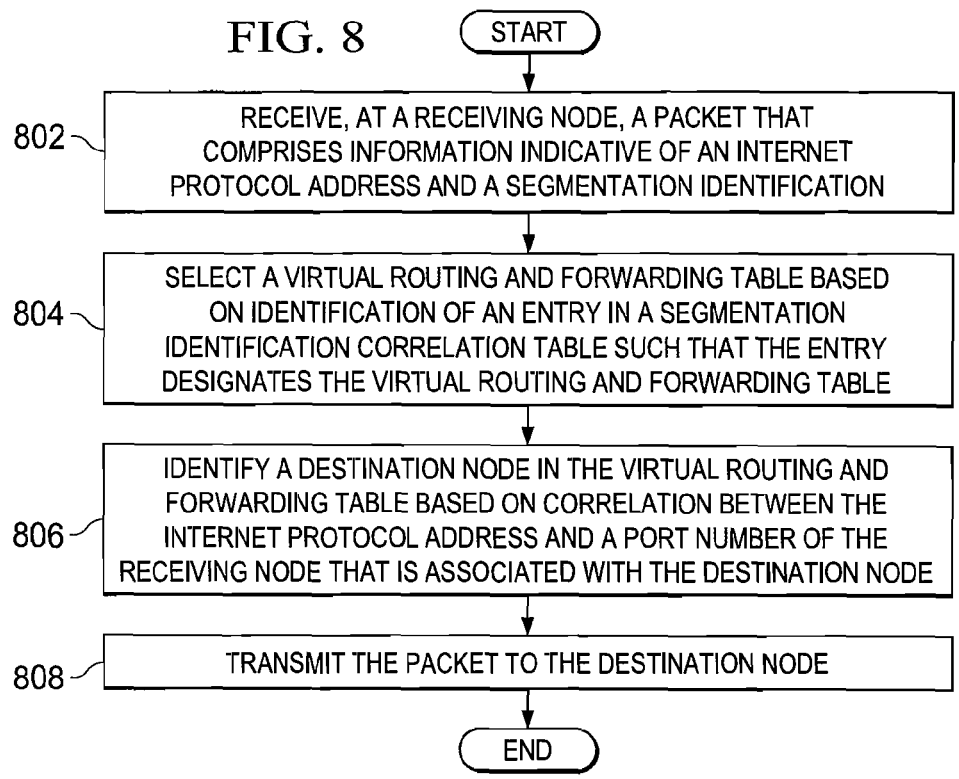

SYSTEM AND METHOD FOR UTILIZATION OF A SEGMENTATION IDENTIFICATION TO SUPPORT TRANSMISSION OF DATA TO A DESTINATION NODE

TECHNICAL FIELD

This disclosure relates in general to the field of communications and, more particularly, to utilization of a segmentation identification to support transmission of data to a destination node in a data center environment.

BACKGROUND

As data centers and associated data services grow in size and in complexity, it may be desirable for communication protocols to be adapted to handle the transmission of data within the data center. For example, in a multitenancy environment, it may be desirable to avoid implementation of unnecessary constructs and/or complexities associated with designation of a service instance, a network node, a destination port, a virtual local area network, and/or the like. In such a situation, it may be desirable to allow for alternative means for transmission of a packet to a destination node.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram showing apparatus communication according to at least one example embodiment;

FIG. 5 is a simplified illustration showing a correlation table according to at least one example embodiment;

FIGS. 6A-6D are simplified block diagrams and illustrations showing apparatus communication and configuration according to at least one example embodiment;

FIG. 7 is a simplified flowchart showing activities associated with transmitting a packet to a destination node according to at least one example embodiment;

FIG. 8 is a simplified flowchart showing activities associated with transmitting a packet to a destination node according to at least one example embodiment.

DETAILED DESCRIPTION OF EXAMPLE EMBODIMENTS

Overview

One or more embodiments may provide an apparatus, a computer readable medium, a non-transitory computer readable medium, a computer program product, and a method for receiving, at a receiving node, a packet that comprises information indicative of an internet protocol address and a segmentation identification, selecting a virtual routing and forwarding table corresponding with the segmentation identification, identifying a destination node based, at least in part, on the internet protocol address and the virtual routing and forwarding table, and transmitting the packet to the destination node. In at least one example embodiment, the segmentation identification relates to a virtual local area network designation associated with the destination node. In at least one example embodiment, the segmentation identification relates to at least one header field of the packet.

Example Embodiments

Figure 1:
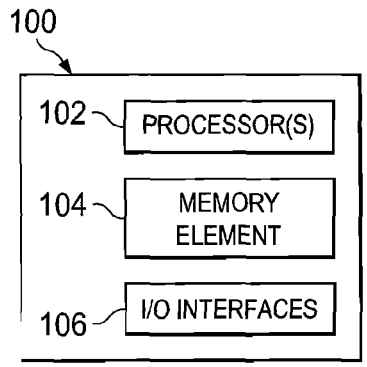
FIG. 1 is a simplified block diagram showing an apparatus according to at least one example embodiment.

FIG. 1 is a simplified block diagram showing an apparatus according to at least one example embodiment. In the example of FIG. 1, electronic apparatus 100 includes processor(s) 102, memory element 104, and input/output (I/O) interface(s) 106. Processor(s) 102 is configured to execute various tasks of electronic apparatus 100 as described herein and memory element 104 is configured to store data associated with electronic apparatus 100. I/O interface(s) 106 is configured to receive communications from and send communications to other devices, user equipment, servers, network elements, nodes, software modules, and/or the like.

FIG. 2 is a simplified block diagram showing apparatus communication according to at least one example embodiment. The example of FIG. 2 is merely an example and does not limit the scope of the claims. For example, spline switch count may vary, leaf switch count may vary, virtual machine count and/or association may vary, tenant count may vary, communication channels may vary, communication paths may vary, and/or the like. Even though the term switch is utilized in the examples hereinafter, it should be understood that where such examples relate to a switch, any suitable component may be utilized. For example, the embodiments hereinafter may relate to one or more routers, one or more gateways, one or more hubs, and/or the like.

In some circumstances, it may be desirable to transmit network communications across a network based, at least in part, on an internet protocol (IP) address. An IP address may, for example, relate to a numerical label assigned to a network node participating in a network utilizing internet protocol for communication. For example, an IP address may provide host addressing, network interface identification, location addressing, destination addressing, source addressing, and/or the like. In at least one example embodiment, a network communication relates to a packet. A packet may, for example, relate to a formatted unit of data carried by and/or over a packet switched network. In some circumstances, a packet may comprise control information, such as header data, footer data, trailer data, and/or the like, and user data, such as a payload, transmitted data, and/or the like. In at least one example embodiment, a packet header comprises data to aid in delivery of user data payload such as a destination media access control address, a source media access control address, a virtual, and/or the like, similar as may be described in FIG. 3.

In some circumstances, a packet is transmitted over a network via a switch. A switch may, for example, relate to a network node that links network segments, network nodes, and/or the like. For example, a switch may relate to a multiport network bridge that processes and switches, routes, transmits, and/or the like data in a network. A switch may, for example, handle data at the data link layer (layer two), at the network layer (layer three), and/or the like. Thus, a switch may relate to a layer two switch, a layer three switch, a multi-layer switch, and/or the like. In some circumstances, switches within a network may be arranged based on a twotier fat-tree. In such circumstances, a higher-tier switch may relate to a spine switch. A lower-tier switch may, for example, relate to a leaf switch. In such circumstances, each spine switch associated with the network may be connected to each leaf switch associated with the network, and vice versa. Such an interconnection of spine switches and leaf switches may, for example, relate to a data center networking fabric. The data center networking fabric may relate to a data center design having two kinds of switches; one that connects servers and the second that connect switches. A leaf switch in the fabric may, for example, denote server connecting switches. A spine switch in the fabric may, for example, denote switches that connect leaf switches.

In some circumstances, it may be desirable to support interconnectivity between various networks via nodes within each respective network. For example, a leaf switch may be configured to provide connectivity to outside networks. Such a leaf switch may relate to a border leaf switch. Additionally, in some circumstances, it may be desirable to support communication between a first switch and a second switch within a network environment. For example, in such circumstances, a switch associated with a network may communicate a packet towards a destination node via one or more additional switches associated with the network.

A destination node may, for example, relate to at least one network node, router, switch, server, virtual machine, virtual server, and/or the like. In at least one example embodiment, a switch may be configured to receive a packet from another network node. Similarly, in one or more example embodiments, a switch may be configured to transmit a packet to another network node. In order to facilitate the transmission of a packet to another network node, in at least one embodiment, a switch may be associated with virtual routing and forwarding tables, similar as described regarding FIG. 4. In one or more example embodiments, a switch may receive a packet from another node and transmit the packet directly to a designated destination node or indirectly to the designated destination node via one or more additional switches associated with the network or a different network. In some circumstances, it may be desirable for a leaf switch to communicate with additional switches associated with a network. For example, in at least one example embodiment, a leaf switch may communicate with other switches, tenants, virtual machines, nodes, and/or the like. A tenant may, for example, relate to a customer, a user, and/or the like. In at least one example embodiment, a tenant may be associated with one or more virtual machines, network nodes, and/or the like.

In the example of FIG. 2, spine switch 202, 204, 206, and 208 relate to spine switches and leaf switch 212, 214, 216, and 218 relate to leaf switches. Each of spine switches 202, 204, 206, and 208 are connected to each of leaf switches 212, 214, 216, and 218. The interconnections between the spine switches and the leaf switches in the example of FIG. 2 may relate to a network fabric. In the example of FIG. 2, leaf switch 218 relates to a border leaf switch in communication with provider network 220 via communication channel 230. Provider network 220 may, for example, relate to an internet service provider network, a wide area network, a local area network, and/or the like. In the example of FIG. 2, leaf switch 212 is in communication with tenant A virtual machine 222 via communication channel 232 and tenant B virtual machine 224 via communication channel 234. Each of communication channels 232 and 234 may relate to a local area network, and/or the like. In the example of FIG. 2, leaf switch 214 is in communication with tenant A virtual machine 226 via communication channel 236 and tenant B virtual machine 228 via communication channel 238. Each of communication channels 236 and 238 may relate to a local area network, a wide area network, and/or the like. In the example of FIG. 2, virtual machines 222 and 226 are both associated with tenant A and virtual machines 224 and 228 are both associated with tenant B. Although FIG. 2 illustrates two tenants and two virtual machines per leaf switch, the number and association of tenants and virtual machines may vary.

In the example of FIG. 2, each of the spine switches may directly communicate with any of the leaf switches via the network fabric. Similarly, each of the leaf switches may directly communicate with any of the spine switches via the network fabric. Conversely, in the example of FIG. 2, a spine switch lacks a direct communication channel with another spine switch. For example, spine switch 202 lacks a direct communication channel with spine switch 204. Similarly, in the example of FIG. 2, a leaf switch lacks a direct communication channel with another leaf switch. For example, leaf switch 212 lacks a direct communication channel with leaf switch 214. In the example of FIG. 2, in order for spine switch 202 to communicate with spine switch 204, it must do so indirectly via the network fabric. For example, spine switch 202 may communicate with leaf switch 21 that, in turn, communicates with spine switch 204.

Figure 3:
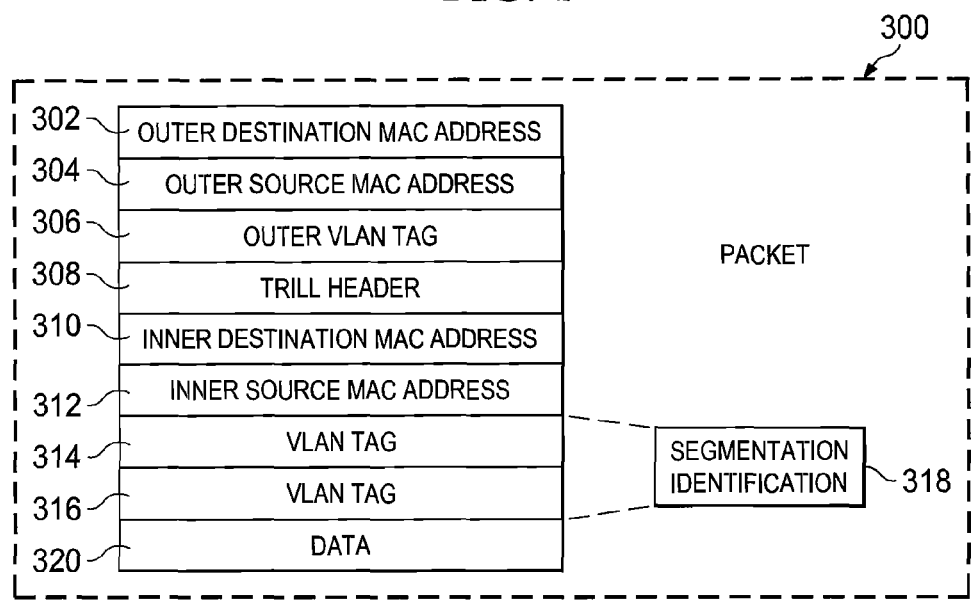
FIG. 3 is a simplified illustration showing a packet header according to at least one example embodiment.

FIG. 3 is a simplified illustration showing a packet header according to at least one example embodiment. The example of FIG. 3 is merely an example and does not limit the scope of the claims. For example, head field count may vary, header field content may vary, header field arrangement may vary, and/or the like.

In some circumstances, a leaf switch may receive a packet from a spine switch via the network fabric. In such an example, the leaf switch may be a node situated on a communication path from a source node and to a destination node. As such, the leaf switch may be tasked with routing, switching, and/or forwarding the received packet to or towards the destination node. In order to effect such transmission of the received packet, it may be desirable for the leaf switch to have knowledge of destination node address information. A received packet may, for example, be comprised of at least one header portion and at least one data portion. In at least one example embodiment, a header portion of a received packet comprises one or more header fields containing packet routing and/or addressing information associated with a destination node. In at least one example embodiment, a received packet comprises information indicative of an internet protocol address associated with a destination node. In some circumstances, it may be desirable to allocate a single internet protocol address to more than one network node in such a way that the two network nodes identified by the same internet protocol address do not cause incorrect routing of communications over the network. For example, in one or more example embodiments, overlapping of internet protocol addresses and/or media access control address may be due, at least in part, to multitenancy support. For example, virtual machines of different tenants may assume the same IP address. In such an example, it may be desirable to allow for distinguishing between two or more network nodes associated with a single internet protocol address. In at least one example embodiment, a network node is associated with an internet protocol address and a secondary distinguishing identifier such that two network nodes associated with the single internet protocol address may be distinguishable based, at least in part, on the secondary identifier. In one or more example embodiments, the secondary identifier may relate to a segmentation identification. The segmentation identification may, for example, relate to a virtual local area network designation associated with a destination node. In at least one example embodiment, a segmentation identification relates to at least one header field of a received packet. The segmentation identification may, for example, be comprised of a first segmentation identification part identified by a first header field of a received packet and a second segmentation identification part identified by a second header field of the received packet. In such an example, the segmentation identification may be associated with more than one header field due to constraints limiting the size of contained in a single header field. Thus, the segmentation identification may span more than one header field such that an single segmentation identification may be determined based, at least in part, on the data contained in the multiple header fields. In one or more example embodiments, a leaf switch, receiving node, and/or the like may receive a packet that comprises information indicative of an internet protocol address and a segmentation identification. Similarly, a leaf switch, receiving node, and/or the like may receive a different packet that comprises information indicative of the internet protocol address and a different segmentation identification. In such an example, the packet and the different packet both designate a single Internet protocol address but designate different segmentation identifications.

FIG. 3 is a simplified illustration showing a packet header according to at least one example embodiment. In the example of FIG. 3, packet 300 relates to a packet received at a leaf switch, a receiving node, and/or the like. In the example of FIG. 3, the number, order, and/or arrangement of header fields may vary. Each of blocks 302-316 relate to a header field within a header portion of packet 300. In the example of FIG. 3, header field 302 relates to an outer destination media access control address, header field 304 relates to an outer source media access control address, header field 306 relates to a virtual local area network tag, header field 308 relates to a transparent interconnection of lots of links header, header field 310 relates to an inner destination media access control address, header field 312 relates to an inner source media access control address, header field 314 relates to a virtual local area network tag, and header field 316 relates to another virtual local area network tag. In the example of FIG. 3, block 320 relates to a data portion of packet 300. Header field 314 may, for example, relate to a first segmentation identification part. Header field 316 may, for example, relate to a second segmentation identification part. Segmentation identification 318 may, for example, be determined based, at least in part, on the first and second segmentation identification parts contained in header fields 314 and 316, respectively.

Figure 4:
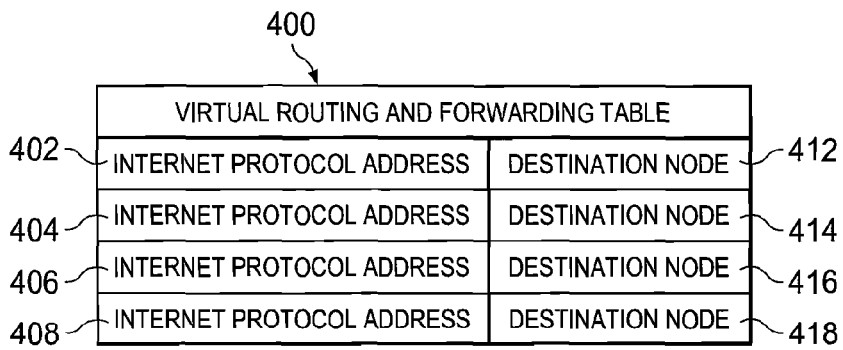
FIG. 4 is a simplified illustration showing a routing table according to at least one example embodiment.

FIG. 4 is a simplified illustration showing a routing table according to at least one example embodiment. The example of FIG. 4 is merely an example and does not limit the scope of the claims. For example, the number of table rows may vary, the number of table columns may vary, table cell content may vary, table cell arrangement may vary, the number of Internet protocol addresses and corresponding destination nodes may vary, and/or the like.

In order to effect the transmission of a received packet to or towards a destination node, it may be desirable to determine the destination node and associated routing and/or addressing information. In at least one example embodiment, a receiving node determines an identity of a destination node based, at least in part, on a virtual routing and forwarding table. The virtual routing and forwarding table may, for example, relate to a forwarding information base and identification of a destination node may comprise selection of the destination node based, at least in part, on correlation between an Internet protocol address specified by the forwarding information base and the destination node. In such an example, the forwarding information base relates to a forwarding table. The forwarding information base may, for example, specify a plurality of correlations between internet protocol addresses and destination nodes. Thus, based on a destination internet protocol address designated in a header field of a header portion of a received packet, a receiving node, such as a leaf switch, may identify a destination node based, at least in part, on the internet protocol address and the virtual routing and forwarding table associated with the receiving node. In one or more example embodiments, the identification of the destination node is based, at least in part, on correlation between the internet protocol address and information indicative of an address of the destination node. Information indicative of an address of the destination node may, for example, relate to a media access control address, a port number, routing information, addressing information, and/or the like. In at least one example embodiment, information indicative of the address of the destination node relates to a port number of the receiving node that is associated with the destination node. In some circumstances, a receiving node may receive a different packet associated with the same internet protocol address but a different virtual routing and forwarding table and thus, potentially a different destination node. In the case of allocation of a single internet protocol address to more than one destination node, selection of a virtual routing and forwarding table versus a different virtual routing and forwarding table may be based, at least in part, on an associated segmentation identification, similar as may be described regarding FIG. 5. In one or more example embodiments, a receiving node identifies a different destination node based, at least in part, on the internet protocol address and the different virtual routing and forwarding table.

Once a destination node associated with a received packet has been identified, in order to maintain proper communication of packets across a network, it may be desirable to cause transmission of the received packet to the destination node. In at least one example embodiment, a receiving node transmits a received packet to a destination node based, at least in part, on a destination internet protocol address and a virtual routing and forwarding table. Similarly, a receiving node may transmit a different received packet to a different destination node based, at least in part, on the destination internet protocol address and a different virtual routing and forwarding table.

FIG. 4 is a simplified illustration showing a routing table according to at least one example embodiment. In the example of FIG. 4, virtual routing and forwarding table 400 may relate to a forwarding table, a forwarding information base, a routing table, and/or the like. In the example of FIG. 4, virtual routing and forwarding table 400 comprises forwarding information for internet protocol address 402, 404, 406, and 408. Internet protocol address 402 corresponds with destination node 412, internet protocol address 404 corresponds with destination node 414, internet protocol address 406 corresponds with destination node 416, and internet protocol address 408 corresponds with destination node 418. In at least one embodiment, a destination node is identified by selecting the destination node corresponding with an internet protocol address associated with a received packet via virtual routing and forwarding table 400. Although the example of FIG. 4 illustrates four internet protocol addresses and four corresponding destination nodes, virtual routing and forwarding table 400 may contain additional internet protocol addresses, destination nodes, and/or other additional fields.

FIG. 5 is a simplified illustration showing a correlation table according to at least one example embodiment. The example of FIG. 5 is merely an example and does not limit the scope of the claims. For example, the number of table rows may vary, the number of table columns may vary, table cell content may vary, table cell arrangement may vary, the number of segmentation identifications and corresponding virtual routing and forwarding tables may vary, and/or the like.

In some circumstances, it may be desirable to associate a switch with more than one virtual routing and forwarding tables. For example, two different virtual routing and forwarding tables may each contain an instance of a single internet protocol address that identifies two different destination nodes. In such an example, it may be desirable to select one of a plurality of virtual routing and forwarding tables based, at least in part, on a segmentation identification associated with a received packet. In one or more example embodiments, a receiving node selects a virtual routing and forwarding table corresponding with a segmentation identification. Selection of a virtual routing and forwarding table may, for example, be based, at least in part, on correlation between a segmentation identification and a virtual routing and forwarding table. In such an example, the correlation between the segmentation identification and the virtual routing and forwarding table may be based, at least in part, on identification of an entry in a segmentation identification correlation table such that the entry designates the virtual routing and forwarding table. The segmentation identification correlation table may, for example, specify a plurality of correlations between segmentation identifications and virtual routing and forwarding tables.

For example, a receiving node may receive a packet comprising information indicative of an internet protocol address and a segmentation identification. In order to facilitate proper transmission of the packet to the correct destination node, the receiving node may select one of a plurality of virtual routing and forwarding tables from a segmentation identification correlation table based, at least in part, on correlation of the segmentation identification. Continuing with the example, a receiving node may receive a different packet comprising information indicative of the same internet protocol address and a different segmentation identification. The receiving node may select a different virtual routing and forwarding table corresponding with the different segmentation identification from the segmentation identification correlation table.

FIG. 5 is a simplified illustration showing a correlation table according to at least one example embodiment. In the example of FIG. 5, segmentation identification correlation table 500 may relate to a forwarding table, a forwarding information base, a routing table, a virtual local area network identification table, a correlation table, and/or the like. In the example of FIG. 5, segmentation identification correlation table 500 comprises virtual routing and forwarding information for segmentation identification 502, 504, 506, and 508. Segmentation identification 502 corresponds with virtual routing and forwarding table 512, segmentation identification 504 corresponds with virtual routing and forwarding table 514, segmentation identification 506 corresponds with virtual routing and forwarding table 516, and segmentation identification 508 corresponds with virtual routing and forwarding table 518. In at least one embodiment, a virtual routing and forwarding table will be identified by selecting the virtual routing and forwarding table corresponding with a segmentation identification associated with a received packet via segmentation identification correlation table 500. Although the example of FIG. 5 illustrates four segmentation identifications and four corresponding virtual routing and forwarding tables, segmentation identification correlation table 500 may contain additional segmentation identifications, virtual routing and forwarding tables, and/or other additional fields.

FIGS. 6A-6D are simplified block diagrams and illustrations showing apparatus communication and configuration according to at least one example embodiment. The examples of FIGS. 6A-6D are merely examples and do not limit the scope of the claims. For example, spline switch count may vary, leaf switch count may vary, virtual machine count and/or association may vary, tenant count may vary, communication channels may vary, communication paths may vary, leaf switch configuration may vary, spine switch configuration may vary, and/or the like.

In at least one example embodiment, a segmentation identification may be viewed as a new attribute for a virtual local area network. For example, in the case of a host facing port, a virtual port associated with a virtual local area network may be automatically associated with a segmentation identification, or a virtual network segment instance, that is tied to the virtual local area network. As a result, in some circumstances, such as in a multitenancy environment where there are multiple service instances spread across a plurality of network nodes, specifying an instance of a service on a port and virtual local area network basis may be avoided. In at least one example embodiment, the automatic association allows for the avoidance of implementation of additional complexities and constructs in a network environment such as, for example, introduction of bridge domains for virtual network segment instances.

FIG. 6A is a simplified block diagram showing apparatus communication according to at least one example embodiment. In the example of FIG. 6A, two spine switches, spine switch 602 and 604, and two leaf switches, leaf switch 606 and 608, are deployed in the network fabric. Spine switch 602 is in communication with leaf switch 606 and 608 and transmits data, forwards data, routes traffic, and/or the like to leaf switch 606 and 608 via the network fabric. In the example of FIG. 6A, four virtual machines associated with two tenants are in communication with leaf 606 and 608. Leaf switch 606 is associated with at least tenant A virtual machine 610 and tenant B virtual machine 612. In the example of FIG. 6A, other spine switches, leaf switches, tenants, and/or virtual machines may be connected to the network fabric in addition to those illustrated.

In the example of FIG. 6A, spine switch 602 may be associated with spine switch configuration 620 of FIG. 6B, leaf switch 606 may be associated with leaf switch configuration 630 of FIG. 6C, and/or leaf switch 608 may be associated with leaf switch configuration 640 of FIG. 6D.

FIG. 6B is a simplified illustration showing apparatus configuration according to at least one example embodiment. In the example of FIG. 6B, spine switch configuration 620 is associated with spine switch 602 of FIG. 6A. Spine switch 602 of FIG. 6A is allocated a segmentation identification, "VN-SEGMENT 10001," an internet protocol address, "IP ADDRESS 1.1.1.3/24," and two leaf switches, leaf switch 606 of FIG. 6A, "NEIGHBOR 1.1.1.1 REMOTE-AS 6," and leaf switch 608 of FIG. 6A, "NEIGHBOR 1.1.1.2 REMOTE-AS 6."

FIG. 6C is a simplified illustration showing apparatus configuration according to at least one example embodiment. In the example of FIG. 6C, leaf switch configuration 630 is associated with leaf switch 606 of FIG. 6A. Leaf switch 606 of FIG. 6A is configured with five virtual local area networks, "INTERFACE VLAN 1, 10, 20, 100, and 200" associated with five segmentation identifications, "VN-SEGMENT 10001, 10010, 10020, 10100, and 10200," respectively. In the example of FIG. 6C, "INTERFACE VLAN 1" may be used for controlling traffic to the other virtual local area networks. For tenant A, "INTERFACE VLAN 10 and 100" are configured in each of leaf switches 606 and 608 of FIG. 6A and, for tenant B, "INTERFACE VLAN 20 and 200" are configured in each of leaf switches 606 and 608 of FIG. 6A. In the example of FIG. 6C, "INTERFACE VLAN 10" and "INTERFACE VLAN 20" may relate to core virtual local area networks for tenant A and tenant B, respectively. It is important to note that INTERFACE VLAN 1," "INTERFACE VLAN 10," and "INTERFACE VLAN 20" are assigned the same internet protocol address, "IP ADDRESS 1.1.1.1/24," that also corresponds to the internet protocol address assigned to leaf switch 606 of FIG. 6A. For example, a core virtual local area network may be identified by way of assigning a border gateway protocol control switch virtual interface and the core virtual local area network switch virtual interface the same internet protocol address. In such an example, since the border gateway protocol control switch virtual interface and the core virtual local area network switch virtual interface belong to separate virtual routing and forwarding tables, assignment of the same internet protocol address is allowed. In the example of FIG. 6C, segmentation identifications "VN-SEGMENT 10010" and "VN-SEGMENT 10020" are associated with "INTERFACE VLAN 10" and "INTERFACE VLAN 20," respectively. Segmentation identifications "VN-SEGMENT 10100" and "VN-SEGMENT 10200" are associated with "INTERFACE VLAN 100" and "INTERFACE VLAN 200," respectively, which may be used as customer virtual local area networks for tenant A and tenant B, respectively. It is important to note that "INTERFACE VLAN 100" and "INTERFACE VLAN 200" are assigned the same any-cast address, "5.1.1.254/24." In the example of FIG. 6C, the core virtual local area networks and the customer virtual local area networks do not have to be the same of different leaf switches. For example, leaf switch 608 of FIG. 6A may be associated with a different core virtual local area network, "INTERFACE VLAN 30," and a different customer virtual local area network, "INTERFACE VLAN 300," instead of or in addition to the illustrated "INTERFACE VLAN 10" and "INTERFACE VLAN 100."

In the example of FIG. 6C, segmentation identifications associated with "INTERFACE VLAN 10" and "INTERFACE VLAN 20" are carried in packets forwarded from an associated spine switch and may be used as tenant differentiators for forwarded traffic from the network fabric. Leaf switch 606 of FIG. 6A is associated with at least two virtual routing and forwarding tables, "VRF CONTEXT: TENANT A" and "VRF-CONTENT: TENANT B." Thus, forwarded traffic comprising an internet protocol address and a segmentation identification may be properly forwarded to the correct virtual local area network, tenant, virtual machine, network node, and/or the like based, at least in part, on the segmentation identification and the corresponding virtual routing and forwarding table.

FIG. 6D is a simplified illustration showing apparatus configuration according to at least one example embodiment. In the example of FIG. 6D, leaf switch configuration 640 is associated with leaf switch 608 of FIG. 6A. The configuration of leaf switch 608 of FIG. 6A may be similar as described regarding the configuration of leaf switch 606 of FIG. 6A in FIG. 6C. It is important to note that "INTERFACE VLAN 1," "INTERFACE VLAN 10," and "INTERFACE VLAN 20" are assigned the same internet protocol address, "IP ADDRESS 1.1.1.2/24," that also corresponds to the internet protocol address assigned to leaf switch 608 of FIG. 6A.

FIG. 7 is a simplified flowchart showing activities associated with transmitting a packet to a destination node according to at least one example embodiment. In at least one example embodiment, there is a set of operations that corresponds with the activities of FIG. 7. An apparatus, for example electronic apparatus 100 of FIG. 1, or a portion thereof, may utilize the set of operations. The electronic apparatus may comprise means, including, for example processor(s) 102 of FIG. 1, for performance of such operations. In an example embodiment, an apparatus, for example, electronic apparatus 100 of FIG. 1, is transformed by having memory, for example, memory element 104 of FIG. 1, comprising computer code configured to, working with a processor, for example, processor(s) 102 of FIG. 1, cause the apparatus to perform set of operations of FIG. 7.

At block 702, the apparatus (which is the receiving node in this example) receives a packet that comprises information indicative of an internet protocol address and a segmentation identification, similar as may be described regarding FIG. 2 and FIG. 3. At block 704, the apparatus selects a virtual routing and forwarding table corresponding with the segmentation identification, similar as may be described regarding FIG. 4 and FIG. 5. At block 706, the apparatus identifies a destination node based, at least in part, on the internet protocol address and the virtual routing and forwarding table, similar as may be described regarding FIG. 4 and FIG. 5. At block 708, the apparatus transmits the packet to the destination node, similar as may be described regarding FIG. 2 and FIG. 3.

For example, in the topology depicted in FIG. 6A, upon receiving a packet comprising an internet protocol address and a segmentation identification at a receiving node, such as leaf switch 606, the receiving node selects a virtual routing and forwarding table corresponding with the segmentation identification. In such an example, the segmentation identification may relate to "VN-SEGMENT 10010" and the virtual routing and forwarding table may relate to "VRF CONTEXT: TENANT A." As such, the receiving node, leaf switch 606, identifies a destination node based, at least in part, on the internet protocol address and the selected virtual routing and forwarding table, "VRF CONTENT: TENANT A." Based, at least in part, on the identified destination node and associated virtual forwarding and routing table information, the receiving node, leaf switch 606, transmits the packet to the destination node.

FIG. 8 is a simplified flowchart showing activities associated with transmitting a packet to a destination node according to at least one example embodiment. In at least one example embodiment, there is a set of operations that corresponds with the activities of FIG. 8. An apparatus, for example electronic apparatus 100 of FIG. 1, or a portion thereof, may utilize the set of operations. The electronic apparatus may comprise means, including, for example processor(s) 102 of FIG. 1, for performance of such operations. In an example embodiment, an apparatus, for example, electronic apparatus 100 of FIG. 1, is transformed by having memory, for example, memory element 104 of FIG. 1, comprising computer code configured to, working with a processor, for example, processor(s) 102 of FIG. 1, cause the apparatus to perform set of operations of FIG. 8.

At block 802, the apparatus receives, at a receiving node, a packet that comprises information indicative of an internet protocol address and a segmentation identification, similar as may be described regarding block 702 of FIG. 7.

At block 804, the apparatus selects a virtual routing and forwarding table based, at least in part, on identification of an entry in a segmentation identification correlation table such that the entry designates the virtual routing and forwarding table, similar as may be described regarding FIG. 4 and FIG. 5. At block 806, the apparatus identifies a destination node in the virtual routing and forwarding table based, at least in part, on correlation between the internet protocol address and a port number of the receiving node that is associated with the destination node, similar as may be described regarding FIG. 4 and FIG. 5. At block 808, the apparatus transmits the packet to the destination node, similar as may be described regarding block 708 of FIG. 7.

For example, in the topology depicted in FIG. 6A, upon receiving a packet comprising an internet protocol address and a segmentation identification at a receiving node, such as leaf switch 606, the receiving node selects a virtual routing and forwarding table based, at least in part, on identification of an entry in a segmentation identification correlation table such that the entry designates the associated virtual routing and forwarding table. In such an example, the segmentation identification may relate to "VN-SEGMENT 10010" and the virtual routing and forwarding table may relate to "VRF CONTEXT: TENANT A." As such, the receiving node, leaf switch 606, identifies a destination node in the selected virtual routing and forwarding table, "VRF CONTENT: TENANT A," based, at least in part, on correlation between the internet protocol address and a port number of the receiving node that is associated with the destination node. Based, at least in part, on the identified destination node and associated virtual forwarding and routing table information, such as the port number associated with the destination node, the receiving node, leaf switch 606, transmits the packet to the destination node.

Figure 9:
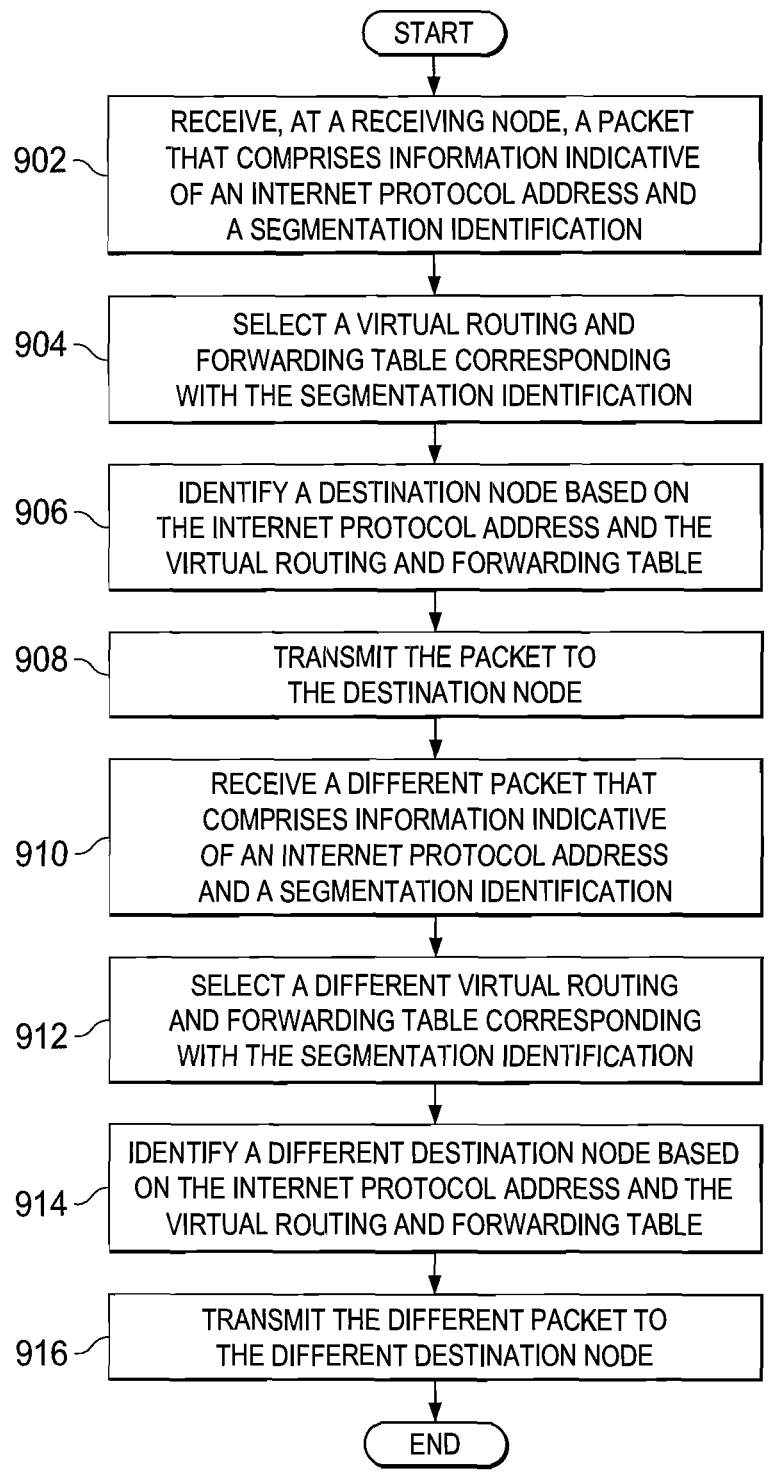
FIG. 9 is a simplified flowchart showing activities associated with transmitting a packet to a destination node according to at least one example embodiment.

FIG. 9 is a simplified flowchart showing activities associated with transmitting a packet to a destination node according to at least one example embodiment. In at least one example embodiment, there is a set of operations that corresponds with the activities of FIG. 9. An apparatus, for example electronic apparatus 100 of FIG. 1, or a portion thereof, may utilize the set of operations. The electronic apparatus may comprise means, including, for example processor(s) 102 of FIG. 1, for performance of such operations. In an example embodiment, an apparatus, for example, electronic apparatus 100 of FIG. 1, is transformed by having memory, for example, memory element 104 of FIG. 1, comprising computer code configured to, working with a processor, for example, processor(s) 102 of FIG. 1, cause the apparatus to perform set of operations of FIG. 9.

At block 902, the apparatus receives, at a receiving node, a packet that comprises information indicative of an internet protocol address and a segmentation identification, similar as may be described regarding block 702 of FIG. 7. At block 904, the apparatus selects a virtual routing and forwarding table corresponding with the segmentation identification, similar as may be described regarding block 704 of FIG. 7. At block 906, the apparatus identifies a destination node based, at least in part, on the internet protocol address and the virtual routing and forwarding table, similar as may be described regarding block 706 of FIG. 7. At block 908, the apparatus transmits the packet to the destination node, similar as may be described regarding block 708 of FIG. 7. At block 910, the apparatus receives a different packet that comprises information indicative of an internet protocol address and a different segmentation identification, similar as may be described regarding FIG. 2 and FIG. 3.

At block 912, the apparatus selects a different virtual routing and forwarding table corresponding with the different segmentation identification, similar as may be described regarding FIG. 4 and FIG. 5. At block 914, the apparatus identifies a different destination node based, at least in part, on the internet protocol address and the different virtual routing and forwarding table, similar as may be described regarding FIG. 4 and FIG. 5.

At block 916, the apparatus transmits the different packet to the different destination node, similar as may be described regarding FIG. 2 and FIG. 3. For example, in the topology depicted in FIG. 6A, upon receiving a packet comprising an internet protocol address and a segmentation identification at a receiving node, such as leaf switch 606, the receiving node selects a virtual routing and forwarding table corresponding with the segmentation identification. In such an example, the segmentation identification may relate to "VN-SEGMENT 10010" and the virtual routing and forwarding table may relate to "VRF CONTEXT: TENANT A." As such, the receiving node, leaf switch 606, identifies a destination node based, at least in part, on the internet protocol address and the selected virtual routing and forwarding table, "VRF CONTENT: TENANT A." Based, at least in part, on the identified destination node and associated virtual forwarding and routing table information, the receiving node, leaf switch 606, transmits the packet to the destination node. Continuing with the example, the receiving node, leaf switch 606, then receives a different packet comprising the same internet protocol address and a different segmentation identification. The receiving switch, leaf switch 606, selects a different virtual routing and forwarding table corresponding with the different segmentation identification. In such an example, the segmentation identification may relate to "VN-SEGMENT 10020" and the virtual routing and forwarding table may relate to "VRF CONTEXT: TENANT B." As such, the receiving node, leaf switch 606, identifies a different destination node based, at least in part, on the same internet protocol address and the different virtual routing and forwarding table, "VRF CONTENT: TENANT B." Based, at least in part, on the identified different destination node and associated different virtual forwarding and routing table information, the receiving node, leaf switch 606, transmits the packet to the different destination node. It is important to notice that the received packet and the different received packet were both associated with a single internet protocol address, "IP ADDRESS 1.1.1.1/24," but were transmitted to two different destination nodes based, at least in part, on the two different segmentation identifications, "VN-SEGMENT 10010" and "VN-SEGMENT 10020."

As used herein, the spine switches, leaf switches, and virtual machines are nodes that can facilitate the network communication activities discussed herein. As used herein in this Specification, the term 'node' is meant to encompass routers, switches, cable boxes, gateways, bridges, loadbalancers, access concentrators, firewalls, inline service nodes, proxies, servers, processors, modules, or any other suitable device, component, element, proprietary appliance, or object operable to exchange information in a network environment. These nodes may include any suitable hardware, software, components, modules, interfaces, or objects that facilitate the operations thereof. This may be inclusive of appropriate algorithms, communication protocols, and interfaces that allow for the effective exchange of data or information.

In one implementation, one or more of the nodes include software to achieve (or to foster) the network communication activities discussed herein. This could include, for example, the implementation of instances of software modules (where these modules interact, perform reciprocating functions, and/or suitably coordinate their activities with peers). Additionally, each of these elements can have an internal structure (e.g., a processor, a memory element, etc.) to facilitate some of the operations described herein. In other embodiments, these network communication activities may be executed externally to these elements, or included in some other network element to achieve the intended functionality. Alternatively, one or more of the nodes may include software (or reciprocating software) that can coordinate with other network elements in order to achieve the network communication activities described herein. In still other embodiments, one or several devices may include any suitable algorithms, hardware, software, components, modules, interfaces, or objects that facilitate the operations thereof.

Note that in certain example implementations, the functions outlined herein associated with network interactions may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory [as shown in FIG. 1] can store data used for the operations described herein. This includes the memory being able to store instructions (e.g., software, logic, processor instructions, etc.) that can be executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Furthermore, various memory items (e.g., databases, tables, queues, buffers, caches, trees, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the present disclosure (and its teachings) are readily scalable and can accommodate a large number of components, as well as more complicated/sophisticated arrangements and configurations. Accordingly, the examples provided should not limit the scope or inhibit the broad teachings of the present disclosure as potentially applied to a myriad of other architectures.

It is important to note that the steps in the preceding flow diagrams illustrate only some of the possible signaling scenarios and patterns that may be executed by, or within, electronic apparatus 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. If desired, the different functions discussed herein may be performed in a different order and/or concurrently with each other. For example, blocks 910, 912, 914, and 916 of FIG. 9 may be performed before block 902 of FIG. 9. Furthermore, if desired, one or more of the above-described functions may be optional or may be combined. The preceding operational flows have been offered for purposes of example and discussion. Substantial flexibility is provided by electronic apparatus 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although electronic apparatus 100 has been illustrated with reference to particular elements and operations that facilitate the communication process, these elements and operations may be replaced by any suitable architecture or process that achieves the intended functionality of electronic apparatus 100.

Although various embodiments are set out in the independent claims, other embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are variations and modifications which may be made without departing from the scope of the present specification as defined in the appended claims.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   at least one processor;
   at least one memory including computer program code, the memory and the computer program code configured to, working with the processor, cause the apparatus to perform at least the following:
   receive, at the apparatus, a packet that comprises information indicative of an internet protocol address and a segmentation identification;
   select a virtual routing and forwarding table corresponding with the segmentation identification;
   identify a destination node based, at least in part, on the internet protocol address and the virtual routing and forwarding table; and
   transmit the packet to the destination node.

2. The apparatus of claim 1, wherein the segmentation identification relates to a virtual local area network designation associated with the destination node.

3. The apparatus of claim 1, wherein the segmentation identification relates to at least one header field of the packet.

4. The apparatus of claim 1, wherein the segmentation identification comprises a first segmentation identification part identified by a first header field of the packet and a second segmentation identification part identified by a second header field of the packet.

5. The apparatus of claim 1, wherein the selection of a virtual routing and forwarding table is based, at least in part, on correlation between the segmentation identification and the virtual routing and forwarding table.

6. The apparatus of claim 5, wherein the correlation between the segmentation identification and the virtual routing and forwarding table is based, at least in part, on identification of an entry in a segmentation identification correlation table such that the entry designates the virtual routing and forwarding table.

7. The apparatus of claim 1, wherein the identification of the destination node is based, at least in part, on correlation between the internet protocol address and information indicative of an address of the destination node.

8. The apparatus of claim 7, wherein the information indicative of the address of the destination node relates to a port number of the apparatus that is associated with the destination node.

9. The apparatus of claim 1, wherein the memory further includes computer program instructions that, when executed by the at least one processor, cause the apparatus to perform:
   receipt of a different packet that comprises information indicative of the internet protocol address and a different segmentation identification;
   selection of a different virtual routing and forwarding table corresponding with the different segmentation identification;
   identification of a different destination node based, at least in part, on the internet protocol address and the different virtual routing and forwarding table; and
   transmission of the different packet to the different destination node.

10. A method, comprising:
   receiving, at a receiving node, a packet that comprises information indicative of an internet protocol address and a segmentation identification;
   selecting a virtual routing and forwarding table corresponding with the segmentation identification;
   identifying a destination node based, at least in part, on the internet protocol address and the virtual routing and forwarding table; and
   transmitting the packet to the destination node.

11. The method of claim 10, wherein the segmentation identification relates to a virtual local area network designation associated with the destination node.

12. The method of claim 10, wherein the segmentation identification relates to at least one header field of the packet.

13. The method of claim 10, wherein the selection of a virtual routing and forwarding table is based, at least in part, on correlation between the segmentation identification and the virtual routing and forwarding table.

14. The method of claim 13, wherein the correlation between the segmentation identification and the virtual routing and forwarding table is based, at least in part, on identification of an entry in a segmentation identification correlation table such that the entry designates the virtual routing and forwarding table.

15. The method of claim 10, wherein the identification of the destination node is based, at least in part, on correlation between the internet protocol address and information indicative of an address of the destination node.

16. The method of claim 10, further comprising:
   receiving a different packet that comprises information indicative of the internet protocol address and a different segmentation identification;
   selecting a different virtual routing and forwarding table corresponding with the different segmentation identification;
   identifying a different destination node based, at least in part, on the internet protocol address and the different virtual routing and forwarding table; and
   transmitting the different packet to the different destination node.

17. At least one non-transitory computer-readable medium encoded with instructions that, when executed by a processor, perform:
   receiving, at a receiving node, a packet that comprises information indicative of an internet protocol address and a segmentation identification;
   selecting a virtual routing and forwarding table corresponding with the segmentation identification;
   identifying a destination node based, at least in part, on the internet protocol address and the virtual routing and forwarding table; and
   transmitting the packet to the destination node.

18. The non-transitory computer-readable medium of claim 17, wherein the segmentation identification relates to at least one header field of the packet.

19. The non-transitory computer-readable medium of claim 17, wherein the selection of a virtual routing and forwarding table is based, at least in part, on correlation between the segmentation identification and the virtual routing and forwarding table.

20. The non-transitory computer-readable medium of claim 17, encoded with instructions that, when executed by a processor, perform:
   receiving a different packet that comprises information indicative of the internet protocol address and a different segmentation identification;
   selecting a different virtual routing and forwarding table corresponding with the different segmentation identification;
   identifying a different destination node based, at least in part, on the internet protocol address and the different virtual routing and forwarding table; and
   transmitting the different packet to the different destination node.

* * * * *